(12) United States Patent
Najman

(10) Patent No.: US 7,277,600 B2
(45) Date of Patent: Oct. 2, 2007

(54) SKEW DETECTION

(75) Inventor: Laurent Alain Najman, Paris (FR)

(73) Assignee: OCE Print Logic Technologies S.A., Cedex (FR)

( * ) Notice: Subject to any disclaimer, the term of this patent is extended or adjusted under 35 U.S.C. 154(b) by 763 days.

(21) Appl. No.: 10/648,348

(22) Filed: Aug. 27, 2003

(65) Prior Publication Data

US 2004/0120604 A1 Jun. 24, 2004

(30) Foreign Application Priority Data

Aug. 27, 2002 (EP) .................................. 02292100

(51) Int. Cl.
*G06K 9/36* (2006.01)
*G06K 9/56* (2006.01)
(52) U.S. Cl. ...................................... 382/289; 382/308
(58) Field of Classification Search ................ 382/173, 382/275, 289, 296
See application file for complete search history.

(56) References Cited

U.S. PATENT DOCUMENTS

| | | | |
|---|---|---|---|
| 5,201,011 A * | 4/1993 | Bloomberg et al. | 382/175 |
| 5,276,742 A * | 1/1994 | Dasari et al. | 382/297 |
| 5,848,184 A * | 12/1998 | Taylor et al. | 382/173 |
| 2003/0190090 A1* | 10/2003 | Beeman et al. | 382/284 |

OTHER PUBLICATIONS

Gatos et al., "Applying Fast Segmentation Techniques At a Binary Image Represented By a Set of Non-Overlapping Blocks", IEEE Comput. Soc., Sep. 10, 2001, pp. 1147-1151.

Bloomberg et al., "Measuring Document Image Skew and Orientation," SPIE vol. 2422, Feb. 6, 1995, pp. 302-316.

Fisher et al., "A Rule-Based System for Document Image Segmentation," IEEE Comp. Soc. Press, vol. 1, Conf. 10, Jun. 16, 1990, pp. 567-572.

Das et al., "A Fast Algorithm for Skew Detection of Document Images Using Morphology," Int'l Journal on Document Analysis and Recognition, Dec. 2001, vol. 4, No. 2, pp. 109-114.

Chen et al., "An Automatic Algorithm for Text Skew Estimation in Document Images Using Recursive Morphological Transforms," IEEE Comp. Soc. Press, vol. 3, Conf. 1, Nov. 13, 1994, pp. 139-143.

* cited by examiner

*Primary Examiner*—Kanjibhai Patel
(74) *Attorney, Agent, or Firm*—Birch, Stewart, Kolasch & Birch, LLP

(57) ABSTRACT

Skew angle in a document image is estimated using operators known from mathematical morphology. Skew angle in a document image (A) is estimated by run-length smoothing the image and then producing a plurality of eroded run-length-smoothed images. The run-length-smoothed image (RLSA(A)) is eroded using a linear structuring element ($k_2 L_\alpha$) oriented at each of a plurality of different angles ($\alpha$). The angle of the linear structuring element which produces an eroded image having the greatest surface area is designated as the skew angle. A plurality of run-length-smoothed images ($RLSA_\alpha(A)$) may be produced, each generated by smoothing the document image using a linear structuring element ($k_1 L_\alpha$) oriented at a respective different angle ($\alpha_i$). Then each run-length smoothed image ($RLSA_\alpha(A)$) is eroded using a linear structuring element oriented at the corresponding angle ($\alpha_i$).

22 Claims, 3 Drawing Sheets

Original image
FIG.1(a)
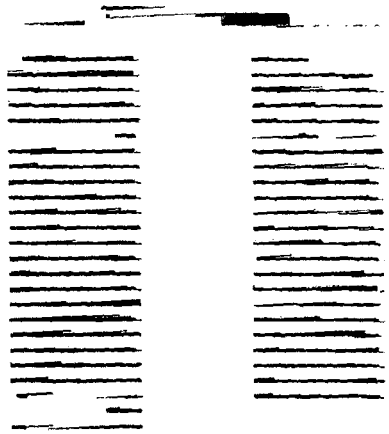
$RLSA_0(A) \ominus k_2L_0$
FIG.1(b)
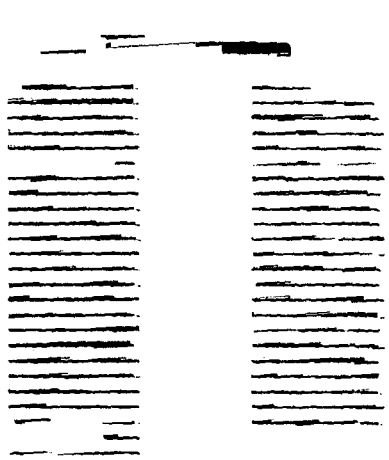
$RLSA_1(A) \ominus k_2L_1$
FIG.1(c)
$RLSA_{-3}(A) \ominus k_2L_{-3}$
FIG.1(d)

SKEW DETECTION

The present application claims, under 35 U.S.C. § 119, the priority benefit of European Patent Application No. 02292100.1 filed Aug. 27, 2002, the entire contents of which are herein fully incorporated by reference.

BACKGROUND OF THE INVENTION

1. Field of the Invention

The present invention relates to the field of image processing and, more particularly, to the detection or estimation of skew in document images.

2. Discussion of the Background Art

The automatic processing of document images, typically by computers, is now widespread and is performed for a variety of reasons including, for example, optical character recognition. Often there are problems in the automatic processing because the document image is skewed. Thus, it is advisable to detect or estimate the skew angle, and correct the skew, before applying any further image processing.

Incidentally, in the present document the expressions "skew detection" and "skew estimation" are both used to designate the process of determining a value for skew angle. The term "estimation" does not denote a lower level of accuracy in determining such a value.

Various techniques have been proposed for automatic skew detection in document images. These are usually methods based on clustering of nearest neighbors, methods based on Hough transform, or methods involving determination of projection profiles. However, these methods suffer from a number of drawbacks. Often the skew estimation/detection process is slow. Also, few methods are applicable to gray-scale images or to images containing drawings. Moreover, most known methods can give inaccurate results when applied to analysis of documents with text in non-Western scripts (for example, in Devnagari and Bangla scripts).

It has been proposed to use techniques derived from mathematical morphology in an algorithm for skew detection in a document image, see for example, the paper entitled "A fast algorithm for skew detection of document images using morphology" by A. K. Das and B. Chanda from IJDAR, International Journal on Document Analysis and Recognition, (2001) 4, pages 109–114. According to this proposal, the morphological operations of "closing" and "opening" (or "dilation" and "erosion") are applied to a document image in order to convert text lines into black bands. Subsequently, the black bands are analyzed in order to find the baseline pixels of each text line, lines of a certain length are extracted and the orientation angles thereof are computed. Then the median angle is taken to represent the skew angle.

Although the algorithm proposed by Das and Chanda is fast and may be applicable to a variety of script forms, it is not well-suited to processing documents containing drawings as well as text. Special steps must be included in the Das and Chanda algorithm in an attempt to minimize the effect of drawings on the skew-angle-estimation process.

The present invention seeks to provide a new technique for skew estimation based on mathematical morphology.

The principles of mathematical morphology were laid down in the 1960s by G. Matheron and J., Serra. When applied to image analysis, mathematical morphology provides a framework for analyzing the shape and form of structures present in the image. Many mathematical morphological operations make use of a probe, or "structuring element", to investigate the structure of the image under analysis. The shape and size of the structuring element must be adapted to the geometric properties of the image objects to be processed. For example, linear structuring elements are suited to the extraction of linear objects in an image.

Set notation is often used to express mathematical morphological operations. The structuring element is often denoted by the set of points B, which constitutes it. When the structuring element is translated onto a point x, then it is written as $B_x$. For a black-and-white image, the set of all white pixels in the image describes the image (the same is true for the set of all black pixels in the image). Such a set can be considered to be an image object F. A corresponding image object f can be defined for a gray-scale image. There is no formal difference between morphological operations whether applied to binary or gray-scale images.

For mathematical morphology on gray-scale images, different equivalent approaches can be taken. A simple idea is to look at the "umbra" of the function, that is the set $\{(y,x)|y<f(x)\}$ and to apply the usual set operators on this set. Generally, for gray-scale images, planar structuring elements are used (for instance a disk would be used in place of a sphere). Thus, the function is considered level set by level set.

Another approach is to define morphological operators using a generalized expression which applies to gray-scale images. For example, the expression for a dilation operation would become:

$$f \oplus B(x) = \sup_{y \in B} f(x+y) \qquad (1)$$

and a binary image would then correspond to the special case where $f(x)=1$ if $x \in X$ and $f(x)=0$ elsewhere.

In the following description, when a binary image is involved, the symbol F will be used to designate the image object. When a gray-scale image is involved, then symbol f will be used, and when the image object can be either gray-scale or binary, the symbol A will be used.

It may be helpful to recall some of the basic operations used in mathematical morphology, notably the operations of dilation, erosion, opening and closing.

Dilation

The operation of "dilation" seeks to answer the question "When a structuring element B is translated onto a point x, does it intersect with the set defining the image object A?" The dilation of an image object A using a structuring element B can be written $\delta_{1,B}(A)$. An image object can be repeatedly dilated. If dilation is repeated n times, then it is said that a dilation of size n has been performed, and the result is written as $\delta_{n,B}(A)$.

In set notation, the dilation of an image can be expressed in terms of Minkowski addition which, for a binary image F gives:

$$\delta_{1,B}(F) = F \oplus B = \{x | B_x \cap F \neq \emptyset\} \qquad (2)$$

In other words, the dilated image $\delta_{1,B}(F)$ will contain image points (typically, black pixels) at all points x for which there is an intersection between the original image F and the structuring element when translated onto x ($B_x$).

For a gray-scale image f, the dilation of the image by the structuring element B can be expressed, in a similar way, as:

$$\delta_{1,B}(f) = (f \oplus B)(x) = \max_{b \in B} f(x+b) \quad (3)$$

In other words, for a point x, the value of this point in the dilated image will be the maximum of the values taken at the points (x+b) in the original gray-scale image f, b representing the vectors defining the points in the structuring element B.

Considered visually, dilation can be likened to adding a layer to objects represented in the image. A dilation of size n adds n layers to the objects.

Erosion

Erosion is the complement to dilation. The operation of "erosion" seeks to answer the question "When a structuring element B is translated onto a point x, is the structuring element completely contained in the set defining the image object A?" The erosion of an image object A using a structuring element B can be written as $\epsilon_{1,B}(A)$. An image object can be repeatedly eroded and $\epsilon_{n,B}(A)$ denotes an image A that has been eroded n times.

In set notation, the erosion of an image can be expressed in terms of Minkowski subtraction which, for a binary image F, gives:

$$\epsilon_{1,B}(F) = F \ominus B = \{x | B_x \subseteq F\} \quad (4)$$

In other words, the eroded image $\epsilon_{1,B}(F)$ will contain image points at all points x for which, when the structuring element is translated onto x it is completely contained within the original image object.

For a gray-scale image f, the erosion of the image by the structuring element B can be expressed, in a similar way, as:

$$\epsilon_{1,B}(f) = (f \ominus B)(x) = \min_{b \in B} f(x+b) \quad (5)$$

In other words, for a point x, the value of this point in the eroded image will be the minimum of the values taken at the points (x+b) in the original gray-scale image f, b representing the vectors defining the points in the structuring element B.

Considered visually, erosion can be likened to stripping off a layer from objects represented in the image.

Opening

The opening operation includes an erosion followed by a dilation (this is not equivalent to a dilation followed by an erosion—see "Closing" below). If an image A is opened by a structuring element B, then the result $\gamma_{1,B}(A)$ can be expressed in a variety of ways:

$$\gamma_{1,B}(A) = A \circ B = A_B = (A \ominus B) \oplus B \quad (6)$$

The first three expressions are just different symbolic representations of "A closed by B", the final expression indicates an erosion followed by a dilation.

Application of the opening operator to an image tends to smooth the contours of objects in the image, to separate an "isthmus" in the image from the "mainland" (if the link between the two is smaller than the structuring element), and to remove objects (or their parts) which are smaller than the structuring element.

Closing

The closing operation includes a dilation followed by an erosion. The closing operation is the dual operation (not the inverse) of the opening operation. If an image A is closed by a structuring element B, then the result $\phi_{1,B}(A)$ can be expressed in a variety of ways:

$$\phi_{1,B}(A) = A \bullet B = A^B = (A \oplus B) \ominus B \quad (7)$$

Application of the closing operator to an image tends to close holes or slits in the image if they are smaller than the structuring element and to cause the union of "islands" to the "mainland" when the distance between them is shorter than the structuring element.

SUMMARY OF THE INVENTION

The preferred embodiments of the present invention make use of operators from mathematical morphology in order to estimate skew in a document image in a new way.

The preferred embodiments of the present invention provide a skew estimation method which is robust, fast, applicable to document images containing text in a variety of scripts, applicable to gray-scale as well as black-and-white images, and which is not unduly affected by the presence of drawings.

More particularly, the present invention provides a method of estimating skew in a document image, the method comprising the steps of: run-length-smoothing the document image; and determining the erosion of the run-length-smoothed image by a linear structuring element oriented at each of a plurality of different angles, so as to determine the angle at which the surface area of the eroded image is maximum, this angle being designated as the skew angle of the document image.

In view of the fact that the erosion of an image by a structuring element results in the set of points where the structuring element can be translated and still be contained within the pre-erosion image, it can be understood intuitively that the eroded image will have a maximum surface area when the structuring element is a linear element aligned with the predominant direction of lines within the pre-erosion image. Thus, the predominant angle of lines within an image can be determined by varying the orientation of a linear structuring element used to erode the image, and detecting the angle at which the eroded image has a maximum surface area. In a skewed document image containing text, this predominant angle tends to be the angle of skew.

The skew estimation method of the present invention works well for both binary (typically black-and-white) images and for gray-scale images. Moreover, the method according to the present invention provides one of the fastest skew-estimation algorithms known to date.

In accordance with an embodiment of the invention, the document image is run-length-smoothed by closing the document image using a linear structuring element. In the field of mathematical morphology the expression "run-length-smoothing" would generally be understood to refer to smoothing using a structuring element oriented at an angle of 0°. However, in the present document "run-length-smoothing" is not limited by reference to any specific orientation of the structuring element.

Advantageously, a plurality of different run-length-smoothed images are produced by closing the document image using a linear structuring element oriented at respective different angles. In this case, the step of eroding the run-length-smoothed image comprises eroding each of the different run-length-smoothed images using a linear structuring element oriented at the same angle as the linear structuring element that was used when producing that run-length-smoothed image.

It is to be understood that in the present document the expression "linear structuring element" is not limited to a line-shaped segment. For example, the linear structuring element used to erode the run-length smoothed image(s) can include a pair of points having a particular angular relationship. In such a case, the determination of how the surface area of the eroded image varies with varying angular orientation of the linear structuring element approximates to a determination of the rose of directions for the image, or the covariance of the image. The "rose of directions" function, $\rho(\alpha)$, can be considered to be a function indicating the probability that lines in the image are oriented at a particular angle $\alpha$.

Rather than calculate the surface area of the eroded run-length-smoothed image for all possible angles of the structuring element, the search for the angle corresponding to maximum surface area in the eroded image can be speeded up by using a one-dimensional optimization algorithm. Preferably the image may be sub-sampled before applying such an algorithm.

A large number of calculations are involved in performing the various dilation and erosion operations in the skew estimation method of the present invention. In order to reduce the computational burden, a recursive algorithm can be used to perform these operations, when a gray-scale image is being processed. These operations can also be performed for binary images using currently-available devices implementing Fast Fourier Transforms.

When the skew estimation method of the present invention is applied to a binary document image, computation can be speeded up by performing a logarithmic decomposition of the structuring element, and employing parallel processing to perform the dilation and erosion operations. More particularly, w pixels of the document image can be allocated to a w-bit data word and a logical operator can be simultaneously applied to the w pixels using a bitwise operator. In such a case the speed of the skew estimation method can be evaluated according to the following expression:

$$O((\log(k_1)+\log(k_1)\log(k_2))nm/w) \qquad (8)$$

where $k_1$ is indicative of the length of the structuring element used in the run-length-smoothing step, $k_2$ is indicative of the length of the structuring element used in the eroding step, and nm is the number of pixels in the document image.

The present invention also provides an apparatus adapted to put into practice the above-described method. This apparatus can comprise a general-purpose computer programmed to implement the method according to the invention.

The present invention yet further provides a computer program product having a set of instructions to cause, when in use on a general-purpose computer, this computer to perform the steps of the skew-estimation method according to the present invention.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other features and advantages of the present invention will become clear from a reading of the following description of preferred embodiments thereof, given by way of example, taken in conjunction with the accompanying drawings, in which:

FIGS. 1(a)–1(d) illustrate examples of the effect of run-length-smoothing and then erosion on a skewed document image according to the present invention;

DETAILED DESCRIPTION OF THE PREFERRED EMBODIMENTS

The following description of the skew-estimation method of the present invention will be given in terms of a preferred embodiment in which the document image being processed contains only text. However, it is to be understood that the present method is applicable to document images which contain drawings as well as text.

Figure 3:
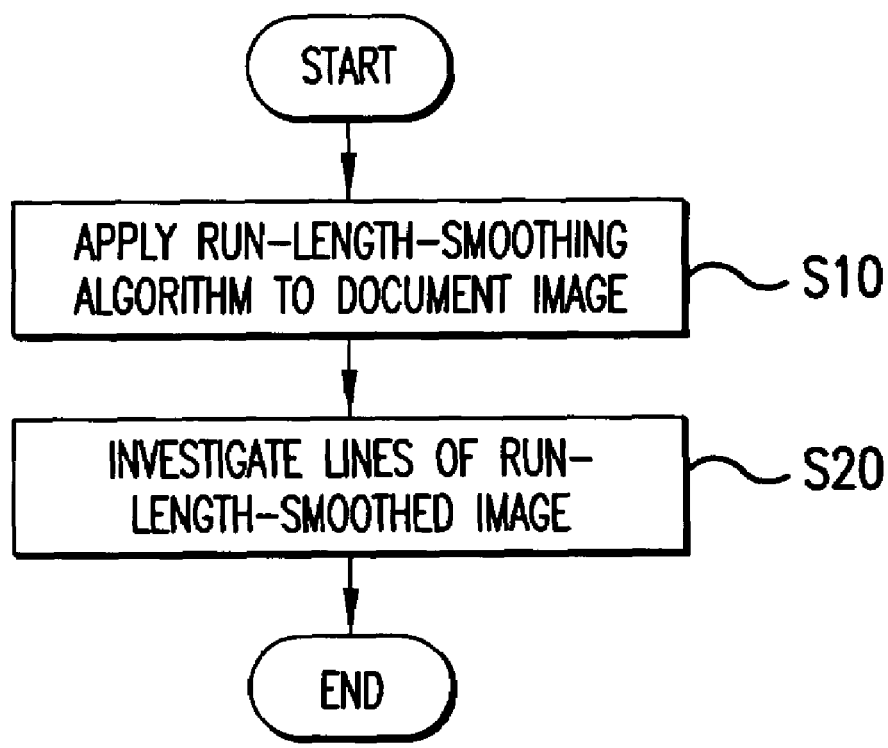
FIG. 3 is a flow chart illustrating a skew-estimation method according to an embodiment of the present invention.

A preferred embodiment of skew-estimation method according to the present invention has two main steps as shown in FIG. 3:

1. a run-length-smoothing algorithm is applied to the document image (S10); and
2. the probability that lines in the run-length-smoothed image are at a given angle is investigated, for different angles, by determining the surface area of the run-length-smoothed image when eroded using a linear structuring element oriented at these different angles (S20).

The method of the present invention can also be extended so as to include not only skew estimation but also skew correction.

Run-length Smoothing

In the run-length-smoothing step of the skew-estimation method according to the present invention, a document image A can be run-length smoothed by closing the image A using a linear structuring element. Advantageously, in one example, a structuring element $k_1 L_\alpha$ is used, which is a horizontal linear segment ($L_0$ is a horizontal linear segment of length unity, $k_1$ is a scaling parameter). It is believed that the value of the scaling parameter $k_1$ is not critical. For text documents, $k_1$ is preferably approximately the same size as a typical word in the text. In an appropriate case, this size could be evaluated from the dpi of the scanner generating the document image. Alternatively, it can be computed, for instance by computing the size of englobing boxes for all the connected components (i.e. the letters) present in the black-and-white image. However, a suitable level of accuracy in the skew estimation can be obtained, and the overall method can be rendered faster, by setting a predetermined value for $k_1$.

The image resulting from applying a run-length-smoothing algorithm including closing the image A using the structuring element $k_1 L_0$ can be denoted by $RLSA_0(A)$, and:

$$RLSA_0(A)=(A \oplus k_1 L^0) \ominus k_1 L_0 \qquad (9)$$

Application of this run-length-smoothing algorithm tends to blur the words in a text line into blobs which merge together into a black band—this process being most successful in merging the words on a text line in a document where there is no skew.

However, a run-length-smoothed image can also be obtained by closing the document image A using a linear structuring element $k_1 L_\alpha$ oriented at any chosen angle $\alpha$.

In other words, we can calculate:

$$RLSA_\alpha(A) = (A \oplus k_1 L_\alpha) \ominus k_1 L_\alpha \qquad (10)$$

This process will be most successful at merging words in a text line into a band in the case where the angle $\alpha$ of the structuring element is the same as the document skew angle. Thus, according to the presently-preferred embodiment of the present invention, the run-length-smoothing step is performed to calculate $RLSA_\alpha(A)$ for a plurality of different values of $\alpha$. Usually document skew angle is within fairly small range of angles (typically $\pm 15°$), so it is often sufficient to calculate $RLSA_\alpha(A)$ values for $\alpha$ in the range of $\pm 15°$. Alternatively, to give a margin for error, it can be useful to calculate $RLSA_\alpha(A)$ values for $\alpha$ in a range somewhat broader than the expected range of skew angle (for example, $\pm 17°$ or $\pm 20°$). Calculating $RLSA_\alpha(A)$ values for too broad a range of $\alpha$ values may disadvantageously increase the time required for computation.

It could be envisaged to apply a dilation, rather than a closing operation, to the document image during this stage of the method according to the invention. However, this may be desirable because it results in a less accurate skew angle estimate and is slower to implement.

Investigating Line Orientation

When an image A is eroded using a linear structuring element $k_2 L_\alpha$ oriented at an angle $\alpha$, the result has a maximum surface area when the orientation angle $\alpha$ of the structuring element matches the predominant angle of lines in the image A. Thus, a function $\rho(\alpha)$ can be defined, as follows:

$$\rho(\alpha) = \text{surface area of } (A \ominus k_2 L_\alpha) \qquad (11)$$

where $k_2$ is a scaling factor, and this function $\rho(\alpha)$ will have a maximum value at an angle $\alpha$ corresponding to the predominant angle of lines in the image P. As for the scaling parameter $k_1$, the value of the scaling factor $k_2$ is not critical. However, it should be sufficiently larger than $k_1$. A suitable value is, for example, of the order of 10 times the size of a typical word in a text document.

Thus, preferred embodiments of the present invention determine the skew angle in a document image by determining the angle at which there is a maximum in the function $\rho(\alpha)$ calculated for the run-length-smoothed document image. This angle should correspond to the predominant angle of lines in the document image.

We could calculate $\rho(\alpha) = $ surface area of $(RLSA_0(A) \ominus k_2 L_\alpha)$, and look for the maximum of this function. However, this would only give an accurate skew angle estimate for small skew angles, and it would be relatively slow to compute. The presently-preferred embodiment of the invention calculates:

$$\rho'(\alpha) = \text{surface area of } (RLSA_\alpha(A) \ominus k_2 L_\alpha) = \qquad (12)$$

$$\rho'(\alpha) = \text{surface area of } \{[(A \oplus k_1 L_\alpha) \ominus k_1 L_\alpha] \ominus k_2 L_{60}\} \qquad (13)$$

In other words, to determine the function $\rho'(\alpha)$ a plurality of run-length-smoothed images, each generated using a linear structuring element at a respective angle $\alpha_i$, are each eroded using a respective linear structuring element oriented at the corresponding angle $\alpha_i$. The angle at which $\rho'(\alpha)$ has a maximum is the estimated skew angle.

The above expression (13) for $\rho'(\alpha)$ requires computation of the surface area of an entity $\{[(A \oplus k_1 L_\alpha) \ominus k_1 L_\alpha] \ominus k_2 L^\alpha\}$ resulting from performance of a closing operation $(A \oplus k_1 L_\alpha) \ominus k_1 L_\alpha$ followed by an erosion $\ominus k_2 L_\alpha$. However, because of the associative nature of morphological operators, this entity is also equal to the result of performing a dilation $A \oplus k_1 L_\alpha$ followed by an erosion $\ominus (k_1 + k_2) L_\alpha$. This latter process is quicker to compute. Accordingly, preferred embodiments of the present invention compute the following expression:

$$\rho'(\alpha) = \text{surface area of } [A \oplus k_1 L \alpha] \ominus [(k_1 + k_2) L \alpha] \qquad (4.)$$

Test Results

FIG. 1(a) shows an example of a document image A and FIGS. 1(b)–1(d) illustrate examples of the result of run-length-smoothing and then eroding this image using structuring elements oriented at different angles according to the present invention. The document image of FIG. 1(a) has a skew angle of $-3°$.

More particularly, FIG. 1(b) illustrates the result of run-length smoothing the image A of FIG. 1(a) by closing that image using a linear structuring element oriented at $0°$, and then eroding this run-length-smoothed image $RLSA_0(A)$ using a linear structuring element $k_2 L_0$ oriented at $0°$. FIG. 1(c) illustrates the result of run-length smoothing the image of FIG. 1(a) by closing that image using a linear structuring element oriented at $+1°$, and then eroding this run-length-smoothed image $RLSA_1(A)$ using a linear structuring element $k_2 L_1$ oriented at $+1°$. FIG. 1(d) illustrates the result of run-length smoothing the image of FIG. 1(a) by closing that image using a linear structuring element oriented at $-3°$, and then eroding this run-length-smoothed image $RLSA_{-3}(A)$ using a linear structuring element $k_2 L_{-3}$ oriented at $-3°$.

It will be seen from FIG. 1 that, as the angle of the structuring element approaches the correct skew angle, the run-length-smoothed and eroded image has darker, thicker bands. Indeed, the processed image having the darkest, thickest bands is shown in FIG. 1(d), which corresponds to the original document image run-length smoothed and eroded using linear structuring elements oriented at the skew angle. This image (e.g., at $\alpha = -3°$) will have the greatest surface area, as is illustrated by FIG. 2.

Figure 2:
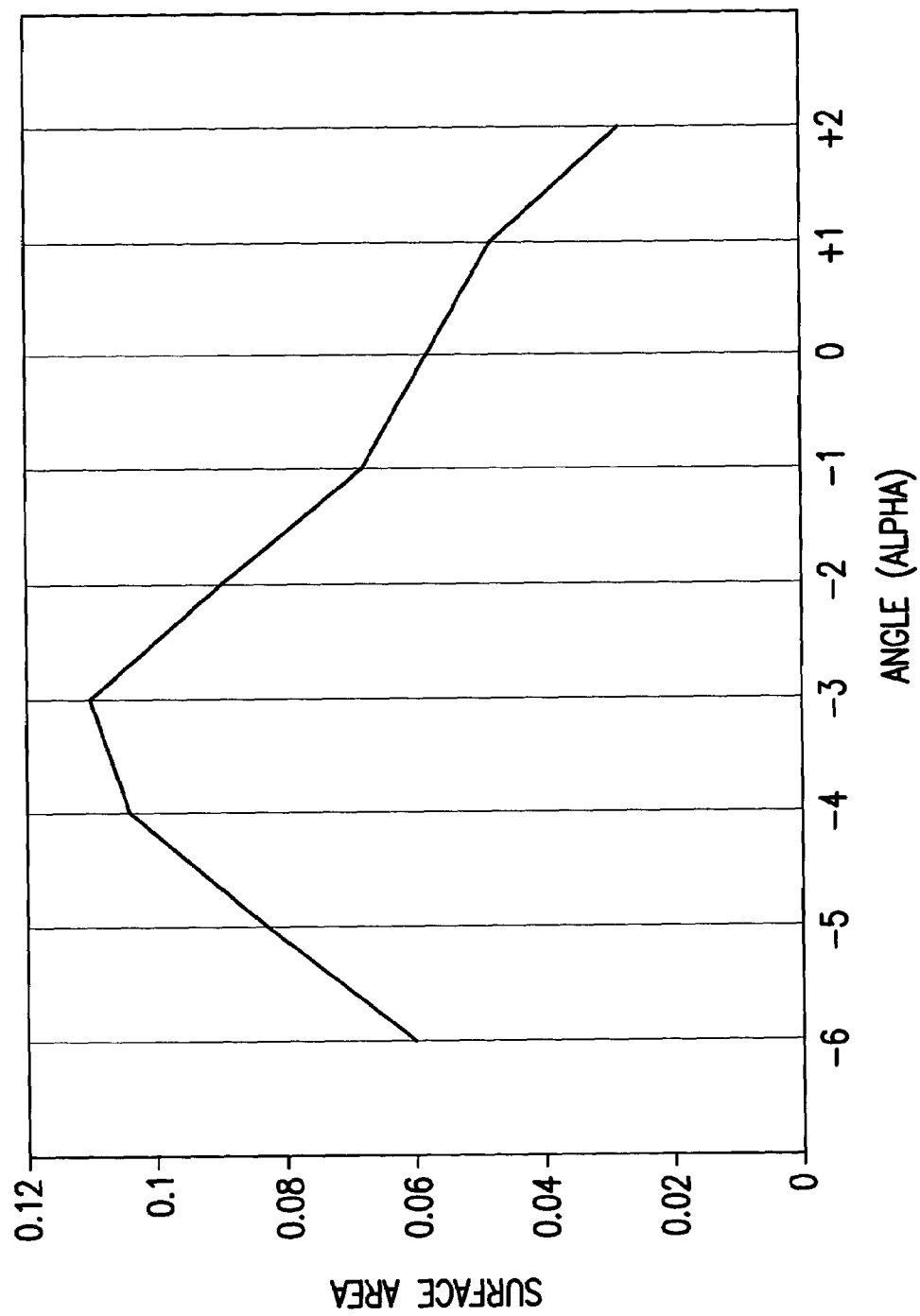
FIG. 2 shows how surface area of an eroded run-length-smoothed document image varies with the angle of the structuring element used in the erosion according to an embodiment of the present invention.

FIG. 2 is a graph showing how the surface area of the run-length-smoothed and eroded images of FIG. 1 vary with the angle $\alpha$. It will be seen that the function $\rho'(\alpha)$ has a maximum at the angle $\alpha = -3°$. Thus, the method of the presently-preferred embodiment of the present invention yields a skew angle estimate of $-3°$.

It will be seen from FIGS. 1 and 2 that the skew-estimation method of the present invention is effective to determine the skew angle of a document image.

Moreover, tests have been performed using the method according to the present invention, with calculations being implemented by a Pentium III®, 733 MHz computer estimating skew in a document image measuring 1214×1151 pixels. Even though the program had not been specifically optimized, an accurate skew estimate was produced in less than 0.75 seconds. If the program had been optimized using known programming techniques, as is preferred according to the present invention, then the calculation time would have been further reduced. Thus, it is apparent that the skew-estimation method of the present invention is amongst the very fastest known.

Computation of the Skew Angle Estimate

When implementing the skew angle estimation method of the present invention there are numerous simplifications and approximations that can be made in order to speed up computation.

It should first be noted that although the invention has been presented in terms of a two-step process, in practice the two steps can be integrated. In other words, the invention is not limited to the case where all run-length smoothing operations are performed first and then all erosion operations are performed subsequently. Notably, as mentioned above, by taking advantage of the associative nature of morphological operations the method can be speeded up by calculating the expression (14) above.

Further, when determining the function $\rho'(\alpha)$ (or $\rho(\alpha)$) for a particular document image, rather than calculating the value of this function for a large number of individual values of $\alpha$, a one-dimensional optimization algorithm can be used in order to reduce the number of individual values of $\rho'(\alpha)$ (or $\rho(\alpha)$) that need to be computed. A suitable level of accuracy in the skew angle estimate can be obtained using Brent's method described in "Numerical Recipes" by W. H. Press, B. P. Flannery, S. A. Teukolsky and W. T. Vetterling, published by Cambridge University Press, 1989, pp. 283–6.

Brent's method is a kind of parabolic interpolation in which the values of six parameters a, b, u, v, w and x, are monitored. The parameters a and b are the limits of a bounding interval in which the minimum is located, x is the point with the lowest function value found so far, w is the point with the second lowest function value found so far, u is the point at which the function was evaluated most recently, and v is the previous value of w. The method is iterative.

According to Brent's method, parabolic interpolation is attempted fitting through the points x, v and w. In order to be considered acceptable, the current parabolic-interpolation step must (i) produce a new minimum which falls within the bounding interval (a,b), and (ii) imply a movement (amount of change) from the best current value x, that is less than half the movement of the step before last. This second criterion ensures that the successive steps of the method will lead to convergence. In the worst case, where successive steps approximately alternate between parabolic steps and golden sections, there will ultimately be convergence thanks to the golden sections.

Preferably, before applying the above-described algorithm according to Brent, the document image is sub-sampled so as to reduce the required computation time. It is to be noted that the sub-sampling operation can be performed simultaneously with the dilation operation.

Moreover, it will be seen that a large number of dilation and erosion operations need to be performed when implementing the skew-estimation method of the present invention. For example, the raw algorithm for computing erosion or dilation of a gray-scale image includes calculating a minimum or maximum value from amongst a number of pixels equal to the number of pixels in the structuring element, for each pixel of the image. For a structuring element of n pixels, there are thus n−1 min/max comparisons per image pixel. This number of calculations can be drastically reduced, thus reducing the overall computation time, by using appropriate algorithms and data structures. Similarly, implementation of dilation and erosion operations in the method of the present invention in general can be optimized by use of appropriate algorithms and data structures. Some examples of preferred techniques are discussed below.

For Skew Estimation in Binary Images

According to the present invention, dilation and erosion operations can be performed using a Fourier transform, as explained in "Mathematical morphology and convolution" by J. E. Mazille published in the Journal of Microscopy, 156(1):3–13, October 1989, and in "Morphological filtering using a Fourier Transform hologram" by M. Killinger, J. L. de Bougrenet de la Tocnaye, P. Cambon and C. Le Moing, published in Optics Communications, 73(6):434–438, November 1989. The skew-estimation method of the present invention can thus be implemented in a rapid and efficient manner by making use of currently-available Fast Fourier Transform devices to perform the dilation and erosion operations required by the method according to the invention, in the manner explained by Mazille and Kilinger et al.

Moreover, the property of associativity of morphological operations mentioned above can be used in conjunction with a logarithmic decomposition of the (convex) structuring element. In particular, it is possible to decompose a convex set using a logarithmic expression based on a definition of extreme sets of a convex set. The relevant definition of extreme sets is given in "Speeding up successive Minkowski operations" by J. Pecht, in Pattern Recognition Letters, 3(2):113–117, 1985. In our case, a line-shaped structuring element can be decomposed into a well-chosen sequence of points. When dealing with images defined on a grid, a line-shaped segment of length 1 is reduced to a pair of points close to each other on the grid. When dealing with longer line-shaped segments, it is not obligatory to consider each point on the projection of the segment on the grid.

Furthermore, dilation and/or erosion operations can be applied in parallel to the various bits of the binary image. Since w pixels of a binary image can be represented using a w-bit data type word, a logical operator implementing dilation/erosion can be simultaneously applied to w pixels of the image using a bitwise operator. In other words, on a machine using 32-bit data-words, 32 pixels of the image can be processed in one machine cycle. This technique is described in detail in the PhD thesis "Mathematical morphology: extension towards computer vision" by R. van den Boomgard, Amsterdam University, 1992, and in the paper "Methods for fast morphological image transform using bitmapped binary images" by R. van den Boomgaard and R. van Balen in Computer Vision, Graphics and Image Processing: Graphical Models and Image Processing, 54(3): 252–258, 1992.

When using an approach combining the logarithmic decomposition of the structuring element with parallel processing of image pixels, the speed of the skew estimation can be evaluated by computing the expression:

$$O((\log(k_1)+\log(k_1)\log(k_2))nm/w, \quad (15)$$

where $k_1$ and $k_2$ are the scaling parameters of the run-length-smoothing and erosion operations, nm is the number of bits in the image (it is an image of dimension n pixels by m pixels), and w is the number of bits in the data-word, and then using a hash table to compute the surface area of the result.

For Skew Estimation in Gray-Scale Images:

When calculating dilations and erosions of a gray-scale image using a structuring element which is a line segment according to the present invention, the number of minimum/maximum comparisons per image pixel can be reduced to 3, regardless of the length of the line segment, using a recursive algorithm proposed by M. van Herk in "A fast algorithm for local minimum and maximum filters on rectangular and orthogonal kernels", published in Pattern Recognition Letters, 13:517–521, 1992. This algorithm can be applied when calculating dilations and erosions involving a linear structuring element oriented at any angle, as explained in "Recursive implementation of erosions and dilations along discrete lines at arbitrary angles" by P. Soille, E. J. Breen and R. Jones, published in IEEE Transactions on PAMI, 18(5): 562–566, 1996. It is advantageous for the present invention to make use of these recursive algorithms when performing dilations and erosions.

It is also noted that a new algorithm for computing dilation/erosion at arbitrary angles has recently been proposed in "Directional Morphological Filtering" by P. Soille and H. Talbot in IEEE Transactions on Pattern Analysis and Machine Intelligence, 2001, vol. 23, no. 11. This algorithm may be used in implementing the method according to the present invention.

The Structuring Element

In the description above, it is stated that the run-length-smoothing step and line-direction investigation step of the present invention make use of a linear structuring element. It is to be understood that this can be a line segment, but that it can also be other structures which have a main direction. For example, in the line-direction investigation step, it is also possible to use a structuring element $k_2 P_{1,\nu}$, where $P_{1,\nu}$ can be derived from the following expression:

$$a. \ P_{\lambda,\nu} = \bigcup_{i=0}^{i=\lambda} i\nu \quad (16)$$

It will be understood that this structuring element includes a pair of points [(0,0) and ($k_2 \cos \alpha, k_2 \sin \alpha$)] separated by fixed distance $k_2$ and having a relative orientation that can be described using angle $\alpha$. As a further example, in the line-direction investigation step, a structuring element corresponding to a rectangle can be used, having the longest line borders thereof oriented at a given angle $\alpha$ (this angle $\alpha$ then being varied, as described above). Other examples will readily occur to the person skilled in this field.

Interestingly, the surface area of erosions by a pair of points separated by a fixed distance but with varying orientations are sometimes represented in a polar diagram which is called a "rose of directions". This is the curve of $(\rho(\alpha), \alpha)$ for $\alpha$ taking values 0 to 360°. Thus, the line-direction investigation step of the present invention is similar to determining the rose of directions (given by equation (11) above) for the run-length-smoothed image.

Also, the covariance K of an image A is calculated by measuring the volume (or the surface area) of the image A eroded by a pair of points $P_{1,\nu}$. More particularly:

$$K(A;P_{1,\nu}) = \text{Vol}(A \ominus P_{1,\nu}(A)) \quad (17)$$

For binary images F, this expression reduces to:

$$K(F;P_{1,\nu}) = \text{Surface Area}(F \cap F_\nu)) \quad (18)$$

Which is the same as the rose of directions.

In view of the above, calculation techniques known for determining the rose of directions and for determining the covariance of an image can be adapted for use in the present invention.

Skew Correction

Figure 4:
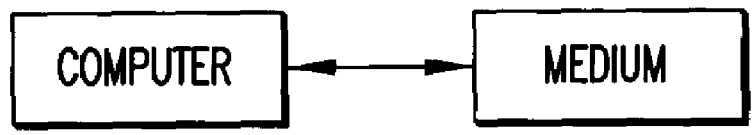
FIG. 4 is an example of a general purpose computer (apparatus) for implementing the method(s) of the present invention.

Once the skew angle of a document image has been estimated/detected, it is a straightforward matter to correct the skew automatically, for example by implementing a simple rotation algorithm. To calculate the correct value for a pixel at a location (x,y) in the skew-corrected image, the original position $(x_{old}, y_{old})$ of the corresponding pixel in the skewed image is calculated using the following equations:

$$x_{old} = x \cos \alpha + y \sin \alpha$$

$$y_{old} = y \cos \alpha - x \sin \alpha \quad (19)$$

Where $\alpha$ is the estimated skew angle of the document image. However, $(x_{old}, y_{old})$ rarely corresponds to a pixel location in the skewed image, so it is usually necessary to interpolate between the values of the surrounding pixels in the skewed document, by taking a weighted average where the weights depend upon the proximity of the respective surrounding pixels to the location $(x_{old}, y_{old})$ As indicated above, the present invention also provides an apparatus for implementing the above-described methods. Typically, this is a suitably-programmed general-purpose computer capable of executing computer program(s) as shown in FIG. 4. However, it is also possible to use dedicated hardware to implement the method.

The processing steps and/or computer program(s) of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Various modifications and developments can be made in the detailed embodiments described herein without departing from the scope of the present invention as described in the appended claims.

The invention claimed is:

1. A method of estimating skew angle in a document image, the method comprising the steps of:
    run-length-smoothing the document image (A); and
    determining an erosion of the run-length-smoothed image (RLSA) by a linear structuring element ($k_2 L_\alpha$) oriented at each of a plurality of different angles ($\alpha$), so as to determine the angle at which a surface area of the eroded image is maximum, said angle being designated as the skew angle of the document image.

2. The skew estimation method of claim 1, wherein the step of run-length-smoothing the document image comprises closing the document image using a linear structuring element ($k_1 L$).

3. The skew estimation method of claim 2, wherein:
    the step of run-length-smoothing the document image (A) comprises producing a plurality of different run-length-smoothed images ($RLSA_\alpha$), each of said different run-length-smoothed images ($RLSA_\alpha$) being produced by closing the document image (A) using a linear structuring element ($k_1L_\alpha$) oriented at a respective one ($\alpha_i$) of said plurality of different angles; and the step of determining the erosion of the run-length-smoothed image comprises eroding each of said plurality of different run-length-smoothed images ($RLSA_\alpha$) using a linear structuring element ($k_2L_\alpha$) oriented at the same angle ($\alpha_i$) as the linear structuring element used in the closing operation producing the respective run-length smoothed image ($RLSA_\alpha$).

4. The skew estimation method of claim 1, wherein the linear structuring element applied in the determining step includes a pair of points ($P_{1,v}$) having a particular angular relationship.

5. The skew estimation method of claim 1, wherein the determining step comprises determining a covariance (K) of the run-length-smoothed image.

6. The skew estimation method of claim 1, wherein the determining step comprises applying a one-dimensional optimization algorithm to determine the angle at which the surface area of the eroded image is a maximum, which reduces the number of angles at which the erosion of the run-length-smoothed image needs to be calculated.

7. The skew estimation method of claim 6, further comprising the step of sub-sampling the document image before applying the one-dimensional optimization algorithm.

8. The skew estimation method of claim 1, wherein when applied to a gray scale document image, a recursive algorithm is used to perform dilation and erosion operations in the run-length-smoothing and determining steps.

9. The skew estimation method of claim 1, wherein when applied to a binary document image, the linear structuring element is decomposed logarithmically, and dilation and/or erosion operations are performed using parallel processing of pixels of the document image.

10. The skew estimation method of claim 1, wherein Fast Fourier Transforms are used to perform dilation and erosion operations in the run-length-smoothing and determining steps.

11. A skew angle estimation apparatus comprising:
run-length-smoothing means adapted to run-length-smooth a document image (A); and
eroding means adapted to determine an erosion of the run-length-smoothed image (RLSA) by a linear structuring element oriented at each of a plurality of different angles, so as to determine the angle at which a surface area of the eroded image is maximum, said angle being designated as a skew angle of the document image.

12. The skew estimation apparatus of claim 11, wherein the run-length-smoothing means is adapted to close the document image using a linear structuring element.

13. The skew estimation apparatus of claim 12, wherein:
the run-length-smoothing means is adapted to produce a plurality of different run-length-smoothed images ($RLSA_{60}$), each of said different run-length-smoothed images ($RLSA_\alpha$) being produced by closing the document image (A) using a linear structuring element oriented at a respective one ($_\alpha$) of said plurality of different angles; and the eroding means is adapted to erode each of said plurality of different run-length-smoothed images ($RLSA_\alpha$) using a linear structuring element oriented at the same angle ($\alpha$) as the linear structuring element used by the run-length-smoothing means in producing the respective run-length smoothed image ($RLSA_\alpha$).

14. The skew estimation apparatus of claim 11, wherein the linear structuring element applied by the eroding means includes a pair of points having a particular angular relationship.

15. The skew estimation apparatus of claim 11, wherein the eroding means comprises means adapted to determine a covariance (K) of the run-length-smoothed image.

16. The skew estimation apparatus of claim 11, wherein the eroding means comprises means applying a one-dimensional optimization algorithm to determine the angle at which the surface area of the eroded image is a maximum, whereby the number of angles at which the erosion of the run-length-smoothed image needs to be calculated is reduced.

17. The skew estimation apparatus of claim 16, further comprising sub-sampling means adapted to sub-sample the document image before the one-dimensional optimization algorithm is applied.

18. The skew estimation apparatus of claim 11, wherein the run-length-smoothing means and eroding means are adapted to use a recursive algorithm to perform dilation and erosion operations when the document image is a gray-scale image.

19. The skew estimation apparatus of claim 11, further comprising parallel processing means for allocating w pixels of the document image to a w-bit data word and applying a dilation and/or erosion operation to the w-bit data word using a bitwise operator.

20. The skew estimation apparatus of claim 11, further comprising Fast Fourier Transform units to perform dilation and erosion operations required by the run-length-smoothing means and eroding means.

21. The skew estimation apparatus of claim 11, wherein the apparatus is implemented in a computer.

22. A computer program product embodied on at least one computer-readable medium accessible by a computer, for estimating a skew angle in a document image, the computer program product comprising computer-executable instructions for:
run-length-smoothing the document image (A); and
determining an erosion of the run-length-smoothed image (RLSA) by a linear structuring element ($k_2L_\alpha$) oriented at each of a plurality of different angles ($\alpha$), so as to determine the angle at which a surface area of the eroded image is maximum, said angle being designated as the skew angle of the document image.

* * * * *